(12) United States Patent
Park

(10) Patent No.: US 7,455,356 B2
(45) Date of Patent: Nov. 25, 2008

(54) SADDLE FOR BICYCLES

(76) Inventor: Kwang Young Park, Hwaseo Jukong Apt 303-304, Hwaseo 2 dong, Paldal-gu, Suwon-si (KR)

( * ) Notice: Subject to any disclaimer, the term of this patent is extended or adjusted under 35 U.S.C. 154(b) by 0 days.

(21) Appl. No.: 11/652,813

(22) Filed: Jan. 12, 2007

(65) Prior Publication Data

US 2008/0169690 A1  Jul. 17, 2008

(51) Int. Cl.
*B62J 1/04* (2006.01)
(52) U.S. Cl. .............. 297/215.14; 297/195.1; 297/213
(58) Field of Classification Search ........... 297/195.1, 297/195.11, 196, 208, 213, 215, 215.13, 297/215.14, 344.11, 344.14, 198, 209, 215.15
See application file for complete search history.

(56) References Cited

U.S. PATENT DOCUMENTS

| 458,609 | A | * | 9/1891 | Willis | 297/207 |
|---|---|---|---|---|---|
| 499,718 | A | * | 6/1893 | Cutler | 297/206 |
| 523,115 | A | * | 7/1894 | Garford | 297/213 |
| 523,944 | A | * | 7/1894 | Perkins | 403/59 |
| 575,509 | A | * | 1/1897 | Newell | 297/213 |
| 577,084 | A | * | 2/1897 | Vail | 267/132 |
| 579,856 | A | * | 3/1897 | Boulton | 297/197 |
| 623,774 | A | * | 4/1899 | Fenton | 297/208 |
| 2,107,447 | A | * | 2/1938 | Marlowe | 482/63 |
| 2,169,105 | A | * | 8/1939 | Linder et al. | 297/213 |
| 3,844,610 | A | * | 10/1974 | Adams | 297/213 |
| 4,919,378 | A | * | 4/1990 | Iwasaki et al. | 248/295.11 |
| 5,513,895 | A | * | 5/1996 | Olson et al. | 297/215.14 |
| 5,709,430 | A | * | 1/1998 | Peters | 297/201 |
| 5,957,527 | A | * | 9/1999 | Brauchart | 297/215.13 |
| 6,019,422 | A | * | 2/2000 | Taormino et al. | 297/195.1 |
| 6,139,098 | A | * | 10/2000 | Carrillo | 297/202 |
| 6,609,751 | B1 | * | 8/2003 | Angelo | 297/201 |
| 6,752,453 | B1 | * | 6/2004 | Yapp | 297/215.14 |
| 6,827,397 | B1 | * | 12/2004 | Driver | 297/215.14 |
| 6,883,865 | B2 | * | 4/2005 | Geyer et al. | 297/195.1 |
| 2007/0257527 | A1 | * | 11/2007 | Marc | 297/215.1 |

* cited by examiner

*Primary Examiner*—David R Dunn
*Assistant Examiner*—Patrick D Lynch
(74) *Attorney, Agent, or Firm*—Wegman, Hessler & Vanderburg

(57) ABSTRACT

A saddle for bicycles has a vertical swiveling unit and a horizontal sliding unit so that the saddle is moved vertically and horizontally, thus providing a sensation similar to riding a horse. The saddle includes a seat sliding unit providing on a lower surface of a seat to move the seat forward and backward, as a user moves forward and backward while sitting on the seat. A guide part with a predetermined length supports the seat sliding unit to guide a horizontal movement of the seat sliding unit, with a free end provided at a rear end of the guide part to allow the guide part to be swiveled vertically. A swiveling spring is provided at a front end of the guide part to provide a vertical elastic force to the guide part. A support part supports the swiveling spring and couples the support part to the seat support frame.

18 Claims, 12 Drawing Sheets

SADDLE FOR BICYCLES

BACKGROUND OF THE INVENTION

1. Field of the Invention

The present invention relates generally to saddles for bicycles including stationary bicycles, and more particularly, to a saddle for bicycles, which is provided with a vertical swiveling unit and a horizontal sliding unit to move a seat horizontally and vertically, thus providing a sensation similar to that of riding a horse to a user, when riding a bicycle.

2. Description of the Related Art

Generally, a bicycle is a vehicle that moves forward by rotating a rear wheel using a rotating force generated from a pedal shaft, when a user sits on a seat supported by a seat support frame and pushes pedals. Now, as various kinds of internal-combustion engines have been developed, the bicycle is used for competition or recreation rather than transportation.

For example, bicycle riding is a highly aerobic activity, thus being efficient for reducing his or her weight, in addition to improving cardiopulmonary function. Further, bicycle riding relieves muscular stiffness, so that it is useful in getting rid of stress. However, because a conventional bicycle or a conventional stationary bicycle is constructed so that wheels thereof are driven by pushing the pedals, it is effective for exercising a lower part of the body, but ineffective for exercising other parts of the body, including an upper part of the body. Further, the conventional bicycle has a problem in that a user repeatedly pushes only the pedals, so that the user is likely to lose interest in riding the bicycle.

In order to solve the problems, there have been developed various types of bicycles that provide a sensation similar to that of riding a horse, when riding a bicycle. In Korean U.M. Registration No. 0299481 there is disclosed a 'stationary bicycle with horse-riding mode'. The bicycle is operated as follows. That is, a user pushes pedals to transmit a rotating force of the pedals to a front wheel. At this time, a rotating motion of a cam mounted to the front wheel is converted to a vertical reciprocating motion of a lever, thus providing the sensation similar to that of riding a horse to the user.

However, the conventional stationary bicycle with horse-riding mode is constructed so that a seat moves up and down by the rotating force of the pedals. Thus, the conventional stationary bicycle has problems in that it has a complicated construction, and the horse-riding effect as well as an exercising effect is poor, because only the vertical movement of the seat is executed. Further, the conventional bicycle with horse-riding mode is provided with a drive unit to move the seat up and down, using the rotating force of the pedals, so that the construction is very complicated, and thereby, it is difficult to practically use the bicycle.

SUMMARY OF THE INVENTION

Accordingly, the present invention has been made keeping in mind the above problems occurring in the prior art, and an object of the present invention is to provide a saddle for bicycles, which is used in place of a conventional fixed-type saddle without changing a structure of a bicycle, and has a vertical swiveling function as well as a horizontal sliding function, thus providing a sensation similar to that of riding a horse to a user, and having excellent exercise effect.

In order to accomplish the above object, the present invention provides a saddle coupled to a seat support frame of a bicycle, including a seat sliding unit provided on a lower surface of a seat to move the seat forward and backward, as a user moves forward and backward while sitting on the seat, a guide part having a predetermined length, and supporting the seat sliding unit to guide a horizontal movement of the seat sliding unit within a predetermined range, with a free end provided at a rear part of the guide part to allow the guide part to be swiveled vertically, when a weight is applied to or removed from the guide part, a swiveling spring provided at a front end of the guide part to provide a vertical elastic force to the guide part, and a support part to support the swiveling spring, and comprising a downwardly bent portion to couple the support part to the seat support frame.

The guide part extends in opposite directions of the seat support frame to predetermined lengths, and the free end is provided at the rear end of the guide part, and the swiveling spring is provided at the front end of the guide part.

The swiveling spring is manufactured to have the vertical elastic force, by bending a rod-shaped or plate-shaped elastic material into a V-shape or winding a rod-shaped elastic material into a coil shape.

The swiveling spring is made of an elastic material comprising a composite having a metal, an elastic rubber, a glass fiber, etc.

The seat sliding unit is provided with a plurality of rolling wheels to smoothly slide along the guide part, with a clamping plate being provided on an upper surface of the seat sliding unit to clamp the seat.

The support part is integrated with the swiveling spring to support the swiveling spring, and is placed under the guide part to be spaced apart from the guide part by a predetermined distance, thus allowing the guide part to be swiveled vertically. The support part includes a downwardly bent portion with a predetermined length to be coupled to the seat support frame using the downwardly bent portion.

The support part forwardly extends from the seat support frame to a predetermined length.

Further, a return/buffer spring is provided on a front portion of the guide part to provide a buffering force and a restoring force to the seat sliding unit, when the seat sliding unit moves forward and backward.

The return/buffer spring is a coil spring including a compression spring part and a tension spring part that each have a predetermined length and are integrated with each other into a single structure.

Further, in order to accomplish the above object, the present invention provides a saddle coupled to a seat support frame of a bicycle, including a guide part to extend in opposite directions of a seat support frame to predetermined lengths so that a seat is installed on the guide part, a swiveling spring integrally provided at a front end of the guide part to vertically swivel a rear end of the guide part, by a weight applied to or removed from the seat, and a support part integrated with the swiveling spring to support the swiveling spring, and placed under the guide part to be spaced apart from the guide part by a predetermined distance, thus allowing the guide part to be swiveled vertically. The support part includes a bent portion with a predetermined length to be coupled to the seat support frame using the bent portion.

A seat sliding unit is provided on a lower surface of the seat to forwardly and backwardly move along the guide part.

Further, a return/buffer spring is provided between a front end of the guide part and the seat sliding unit to provide a buffering force and a restoring force to the seat sliding unit, when the seat sliding unit moves forward and backward.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
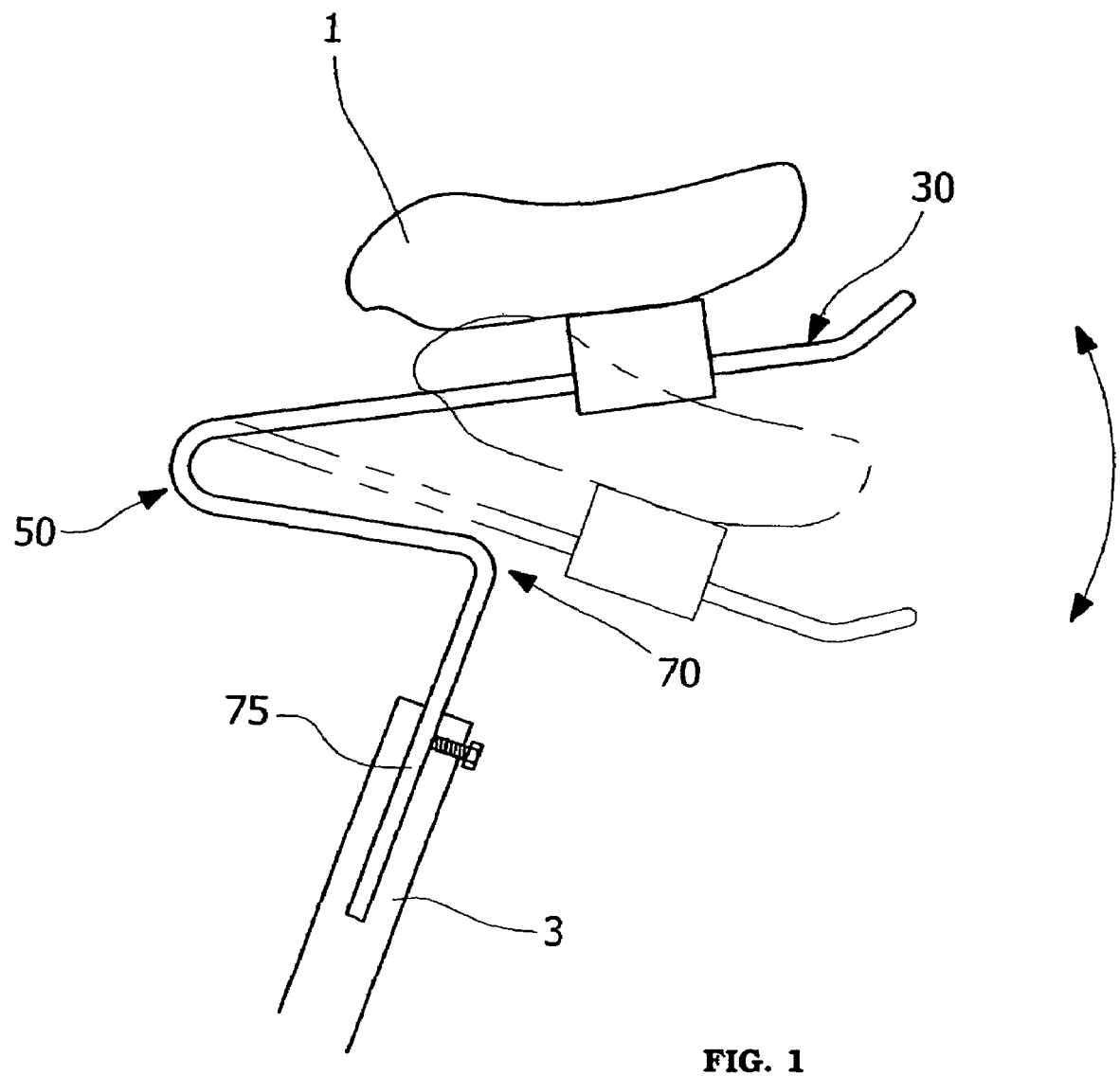
FIG. 1 is a side view of a saddle for bicycles, according to the first embodiment of the present invention.

Hereinafter, embodiments of the present invention will be described in detail with reference to the attached drawings.

Reference now should be made to the drawings, in which the same reference numerals are used throughout the different drawings to designate the same or similar components.

FIG. 1 is a schematic side view of a saddle 10 for bicycles, according to the first embodiment of the present invention. A metal rod having a circular cross-section and high elasticity is bent into a V-shape, as shown in FIG. 1, to provide a guide part 30, a swiveling spring 50, and a support part 70 that are integrated with each other into a single structure. A seat 1 is coupled to the guide part 30.

In a detailed description, the guide part 30 is the metal rod which has predetermined elasticity and extends in opposite directions of a seat support frame 3 to predetermined positions. In this case, a rear end of the metal rod is a free end, thus allowing the guide part 30 to freely swivel up and down. The seat 1 is provided on the guide part 30 to be fixed to the guide part 30 or be movable in a horizontal direction. According to the embodiment, the seat 1 is provided at a rear portion of the guide part 30. The swiveling spring 50 is a bent spring that is integrally provided at a front end of the guide part 30. When a weight is applied to or removed from the seat 1, the swiveling spring 50 provides a predetermined vertical elastic force to the guide part 30, so that the rear end of the guide part 30 swivels in a vertical direction. The support part 70 is integrated with the swiveling spring 50 to support the swiveling spring 50, and is positioned under the guide part 30 to be spaced apart from the guide part 30 by a predetermined distance, thus allowing the guide part 30 to swivel in the vertical direction. A bent portion 75 having a predetermined length downwardly extends from a rear end of the support part 70 so as to be supported by the seat support frame 3.

Thus, when a weight is applied to the rear end of the guide part 30 through the seat 1, the guide part 30 downwardly swivels on the swiveling spring 50. When the guide part 30 swivels downward to a predetermined angle, the guide part 30 upwardly swivels by a restoring force of the swiveling spring 50. Thus, when a user puts his or her weight on the seat 1, the guide part 30 and the seat 1 elastically reciprocate in a vertical direction by a buffering force and a restoring force of the swiveling spring 50. As such, the seat 1 swivels in the vertical direction, thus providing a sensation similar to that of riding a horse to the user.

Figure 2:
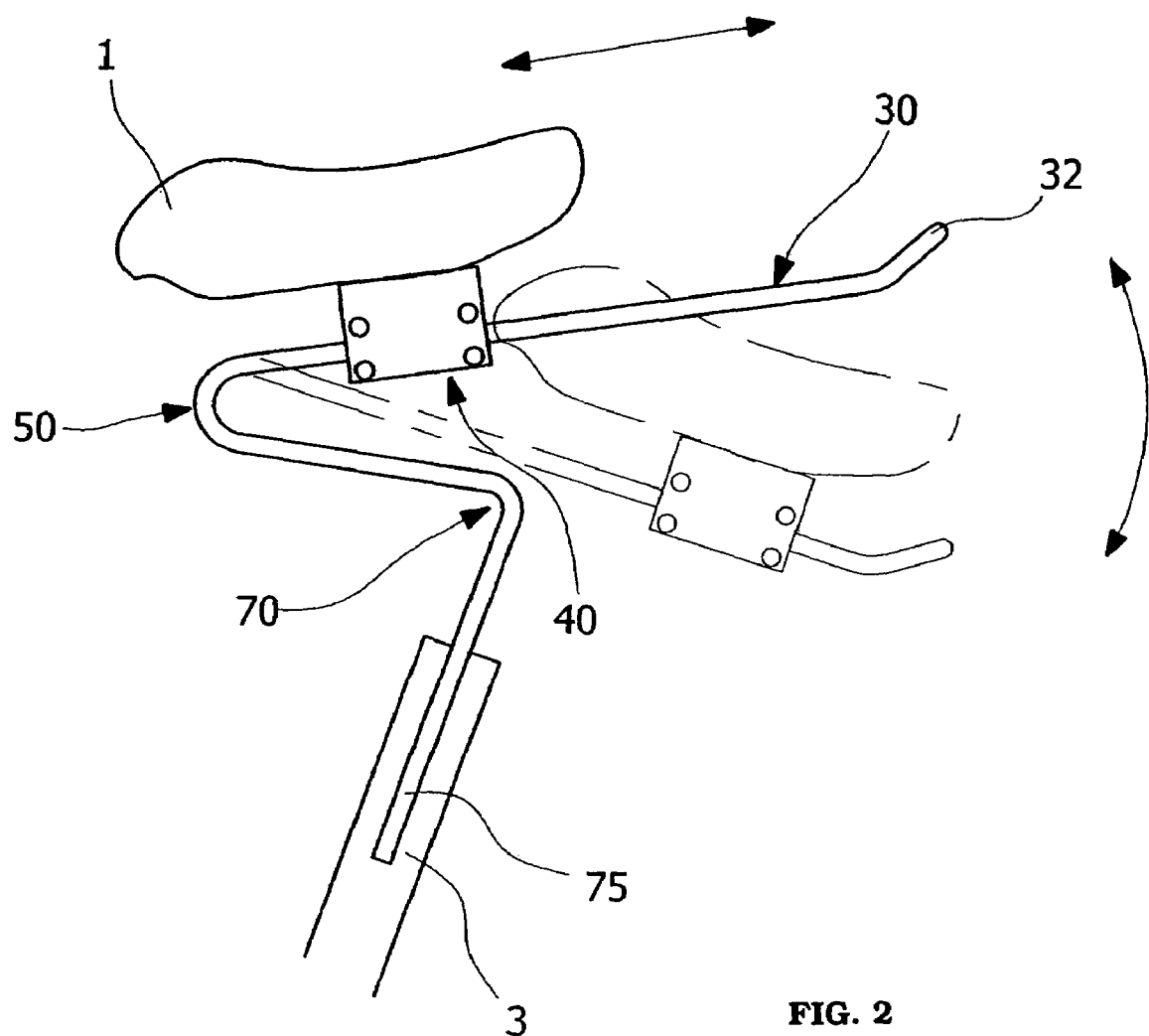
FIG. 2 is a side view of a saddle for bicycles, according to the second embodiment of the present invention.

FIG. 2 is a schematic side view of a saddle 10 for bicycles, according to the second embodiment of the present invention. As shown in FIG. 2, a metal rod having high elasticity and a predetermined diameter is bent at predetermined positions thereof to provide a guide part 30, a swiveling spring 50, and a support part 70 which are integrated with each other into a single structure. A seat 1 is provided at a predetermined position of the guide part 30, which constitutes a straight-line part of the metal rod, to be movable in a horizontal direction. As shown in FIG. 2, the guide part 30 extends in opposite directions of a seat support frame 3 to predetermined lengths. The guide part 30 is upwardly curved at a rear end thereof to provide a stopper 32. Further, a seat sliding unit 40 coupled to the seat 1 is provided at a predetermined portion of the guide part 30 to slide in a horizontal direction. The seat sliding unit 40 includes a body coupled to the guide part 30, and rolling wheels to allow the seat sliding unit 40 to smoothly slide along the guide part 30 forward and backward.

As such, the saddle 10 is constructed so that the seat 1 is installed to slide forward and backward, thus allowing the guide part 30 to be easily swiveled in a vertical direction. That is, when a user desires to swivel the guide part 30 downward, the user pushes both the seat 1 and the seat sliding unit 40 backward while sitting on the seat 1, so that the seat 1 and the seat sliding unit 40 are positioned in back of the seat support frame 3. At this time, a rear end of the guide part 30, which is a free end, swivels downward by a weight of the user. Conversely, when the user desires to swivel the guide part 30 upward, the user pushes the seat 1 and the seat sliding unit 40 forward so that the seat 1 and the seat sliding unit 40 are positioned in front of the seat support frame 3. At this time, a force applied to the guide part 30 is removed, so that the guide part 30 is swiveled upward by a restoring force of the swiveling spring 50. Therefore, when the user appropriately adjusts his or her weight acting on the seat 1 while moving the seat 1 forward and backward, the vertical and horizontal moving ranges of the seat 1 are large, thus providing a sensation similar to that of riding a horse to the user. For example, vertical and horizontal moving ranges of the user sitting on the seat 1 are about 15~20 cm. Thus, vertical and horizontal moving ranges of the user are large, thus allowing the user to feel as if the user rides a horse.

Figure 3:
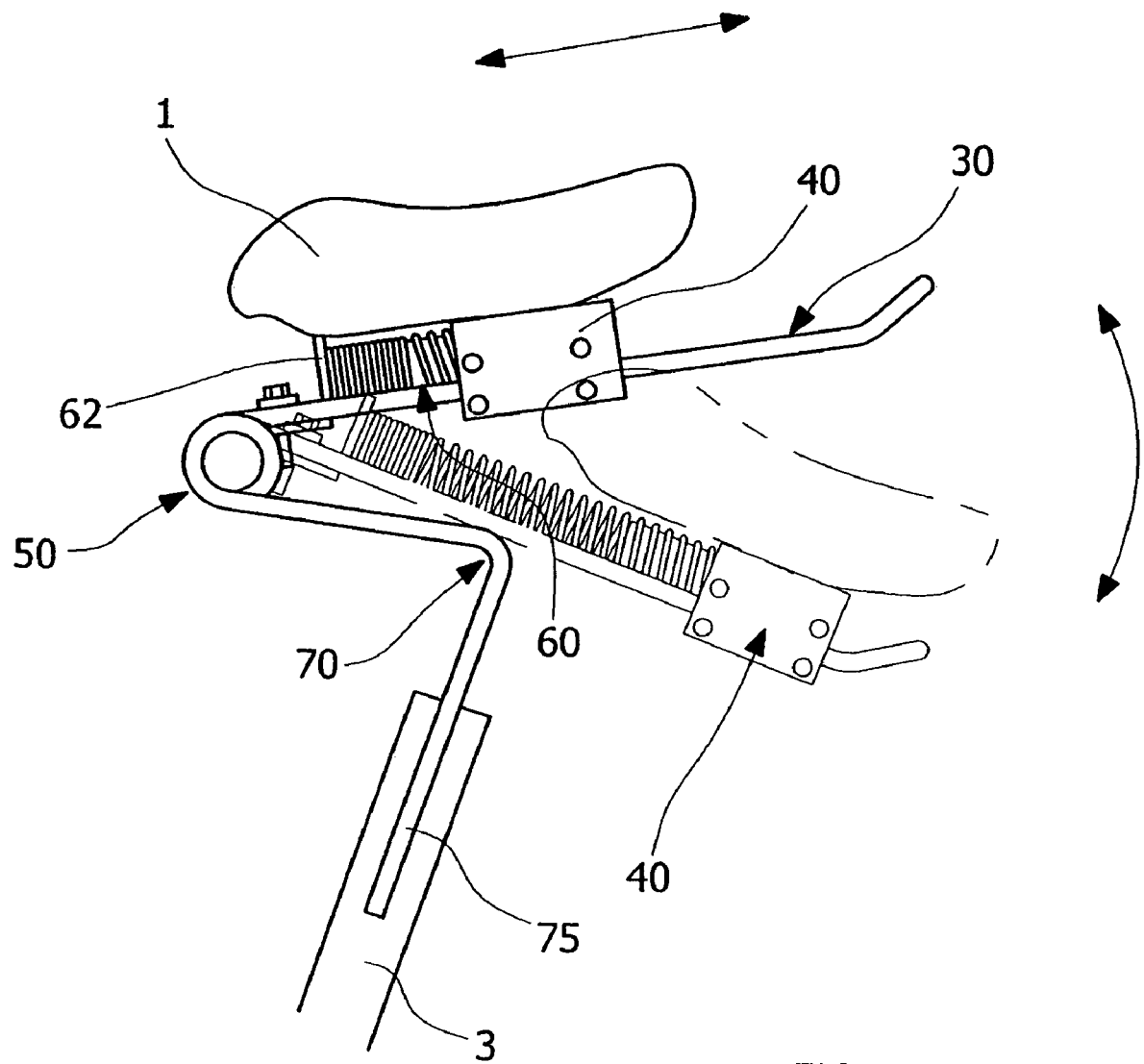
FIG. 3 is a side view a saddle for bicycles, according to the third embodiment of the present invention.

FIG. 3 is a schematic side view a saddle 10 for bicycles, according to the third embodiment of the present invention. As shown in FIG. 3, a metal rod having high elasticity is bent at predetermined positions to provide a guide part 30, a swiveling spring 50, and a support part 70 which are integrated with each other into a single structure. A seat sliding unit 40 coupled to a seat 1 is slidably mounted to the guide part 30. Further, a return/buffer spring 60 is provided in a front of the guide part 30 to provide a restoring force and a buffering force to the seat sliding unit 40.

In a detailed description, a stop plate 62 is provided at a front portion of the guide part 30, and the coil-shaped return/buffer spring 60 is installed between the stop plate 62 and a front surface of the seat sliding unit 40. Thus, when the seat sliding unit 40 moves backward, the return/buffer spring 60 allows the seat sliding unit 40 to be smoothly stopped within a predetermined range. Meanwhile, when the seat sliding unit 40 moves forward, the seat sliding unit 40 is pulled forward by a strong restoring force of the return/buffer spring 60, thus rapidly returning to an original position thereof.

Meanwhile, when the seat sliding unit 40 has been completely moved forward, the seat 1 is positioned above a seat support frame 3, so that a user's weight is not put on a rear end of the guide part 30. Thus, when the user does not want to swivel the guide part 30 in a vertical direction, the saddle 10 is used in a same manner as a conventional saddle. Meanwhile, when the user wants to swivel the guide part 30 in the vertical direction, that is, to feel as if the user rides a horse, the user slides the seat 1 forward and backward. Therefore, the saddle 10 according to this invention does not hinder an original function of a bicycle. Further, if necessary, the saddle 10 may be provided with a locking unit to lock the seat sliding unit 40 to a position, thus preventing unexpected movement of the seat sliding unit 40.

As shown in FIG. 3, a metal rod having high elasticity may be wound in a coil shape to provide the swiveling spring 50 at a junction between the guide part 30 and the support part 70. Such a coiled swiveling spring 50 is more smoothly swiveled in the vertical direction, as compared to a bent-shaped swiveling spring. Further, as long as the swiveling spring 50 provides a predetermined restoring force and buffering force to the guide part 30 so as to swivel the guide part 30 in the vertical direction, various elastic materials, such as a plate spring, a coil spring, a metal spring, an elastic material made of special rubber or synthetic resin, a gas shock absorber, etc. may be used as the swiveling spring 50.

Figure 4:
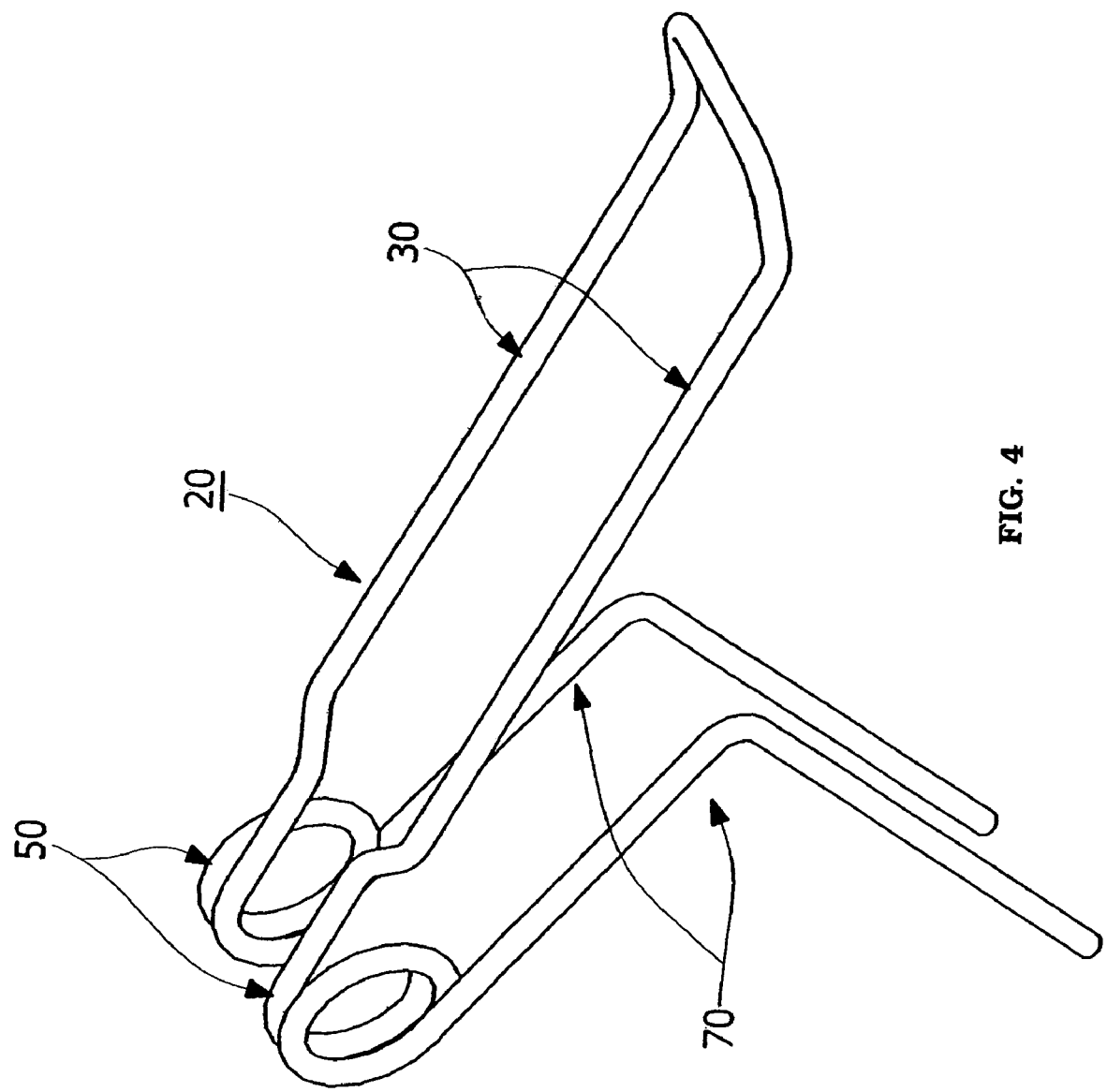
FIG. 4 is a perspective view to show a guide part, a swiveling spring, and a support part included in the saddle, according to the present invention.

FIGS. 4 through 8 show concrete examples of the saddle 10 for bicycles, according to the present invention. FIG. 4 is a perspective view to show an elastic metal rod 20 which is bent at predetermined positions thereof to provide the guide part 30, the swiveling spring 50, and the support part 70 that are integrated with each other into a single structure. As shown in FIG. 4, the guide part 30, the swiveling spring 50, and the support part 70 are manufactured to have a symmetric structure while both sides of each of the guide part 30, the swiveling spring 50, and the support part 70 are spaced apart from each other by a predetermined distance, by bending the elastic metal rod 20 with a predetermined diameter and length. Such a construction prevents the seat 1 and the seat sliding unit 40 coupled to the guide part 30 from being rotated, and allows the swiveling spring 50 to have a sufficient elastic force, and allows the support part 70 to be firmly supported by the seat support frame 3.

Figure 5:
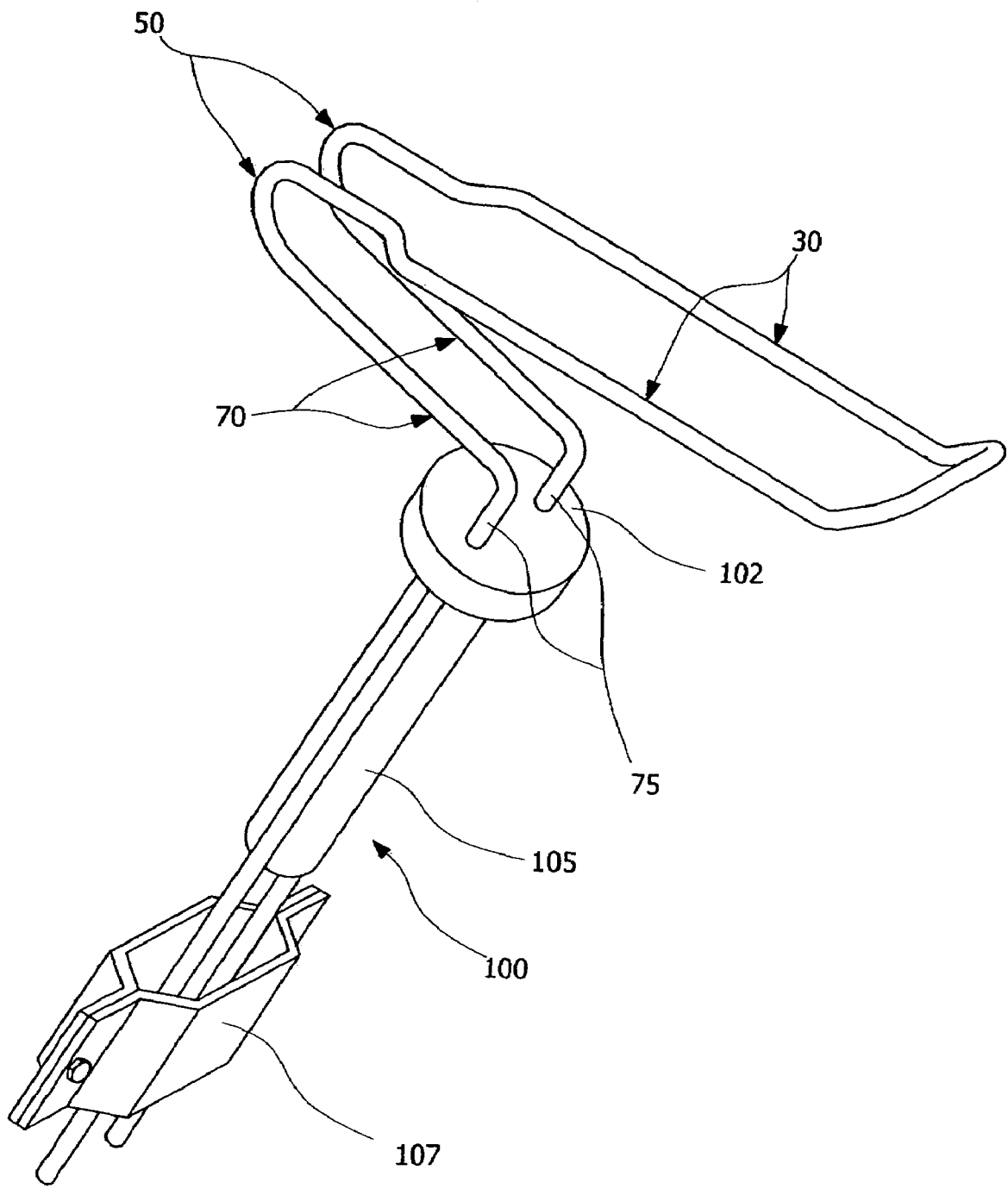
FIG. 5 is a perspective view of a mounting unit that is coupled to the support part, according to the present invention.

FIG. 5 shows a mounting unit 100 mounted to the support part 70. A disc-shaped mounting plate 102 is integrally provided on an upper end of the bent portion 75. An insert rod 105 having a predetermined length is mounted to a lower surface of the mounting plate 102 so as to be inserted into a hollow part of the seat support frame 3. Further, a clamp 107 is mounted to a lower end of the bent portion 75, and functions to clamp the support part 70 to the seat support frame 3 while surrounding an outer circumferential surface of the seat support frame 3. Thus, after an existing saddle is detached from the seat support frame 3, the insert rod 105 of the saddle 10 of this invention is inserted into the seat support frame 3, and a height of the saddle 10 is appropriately adjusted according to a body type of a user. Thereafter, by tightening a fastening bolt provided at a predetermined position of the seat support frame 3, the saddle 10 of this invention is easily installed on a bicycle.

Figure 6:
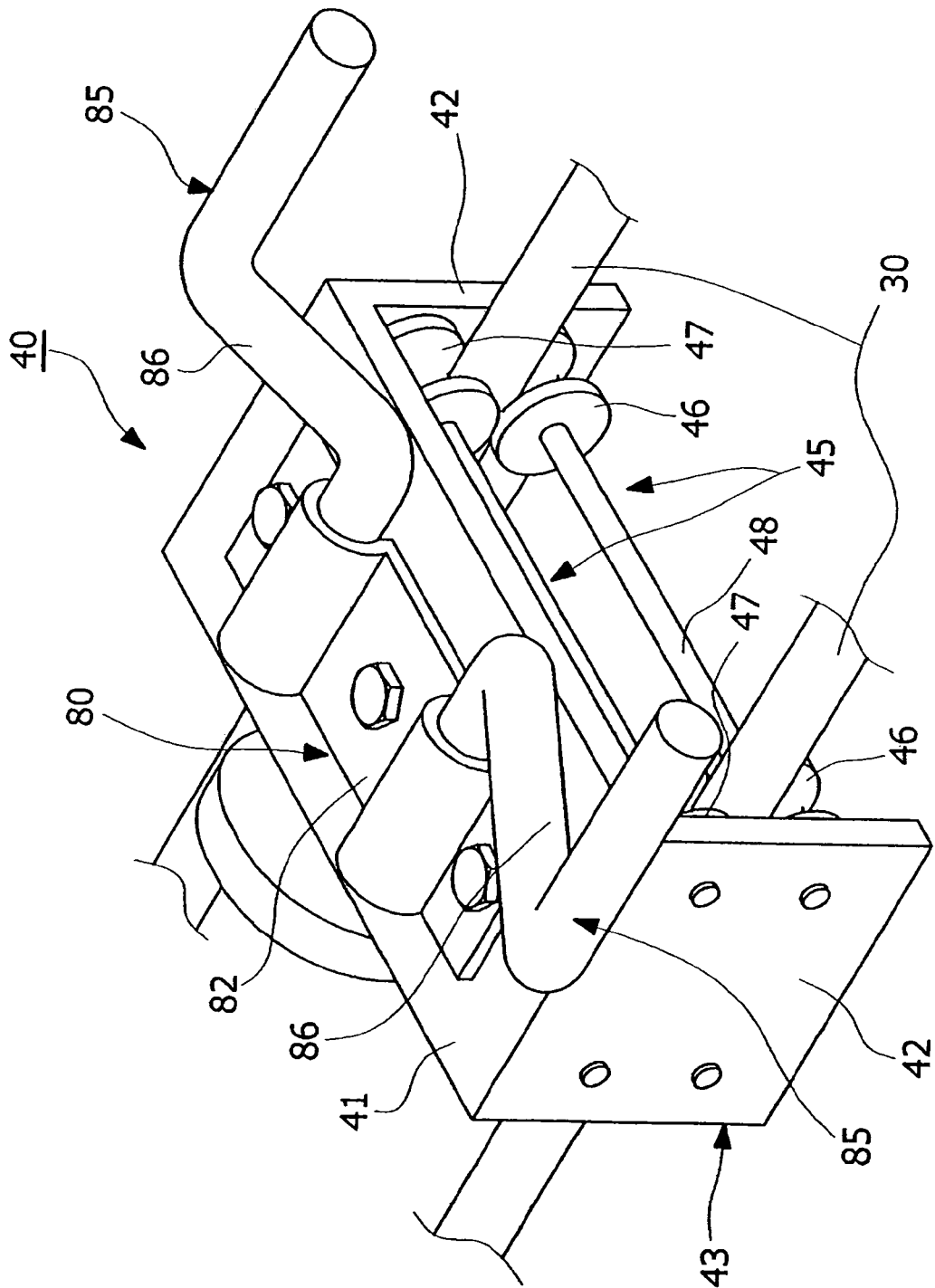
FIG. 6 is a perspective view of a seat sliding unit included in the saddle, according to the present invention.

FIG. 6 is a perspective view of the seat sliding unit 40 coupled to the guide part 30, according to the present invention. The seat sliding unit 40 includes a body 43 having an upper plate 41 and both side plates 42. A plurality of rollers 46 having guide grooves 47 to guide the guide part 30 are coupled to each other by horizontal shafts 48 to be rotatably supported by the side plates 42. According to the embodiment, upper and lower guide units 45 having the rollers 46 that roll along outer surfaces of upper and lower portions of the guide part 30 are installed at front and rear portions of the seat sliding unit 40, thus allowing the seat sliding unit 40 to be smoothly and reliably moved. However, as long as the seat sliding unit 40 can freely move forward and backward along the guide part 30, any shape of seat sliding unit is possible. Of course, a sliding unit that has no rolling wheels may be used as the seat sliding unit 40.

Further, as shown in FIG. 6, a seat clamping unit 80 is provided on the upper plate 41 of the seat sliding unit 40 to clamp the seat 1. The seat clamping unit 80 includes a clamping plate 82 provided on the upper plate 41 of the seat sliding unit 40, and two elastic support rods 85 which define a predetermined space between the seat sliding unit 40 and the seat 1 and provide elasticity to the seat 1. A lower end of each of the elastic support rods 85 is secured to the clamping plate 82, while an upper end of each of the elastic support rods 85 is secured to the lower surface of the seat 1. An inclined part 86 having a predetermined length is provided between the upper and lower ends of each of the elastic support rods 85.

Figure 7:
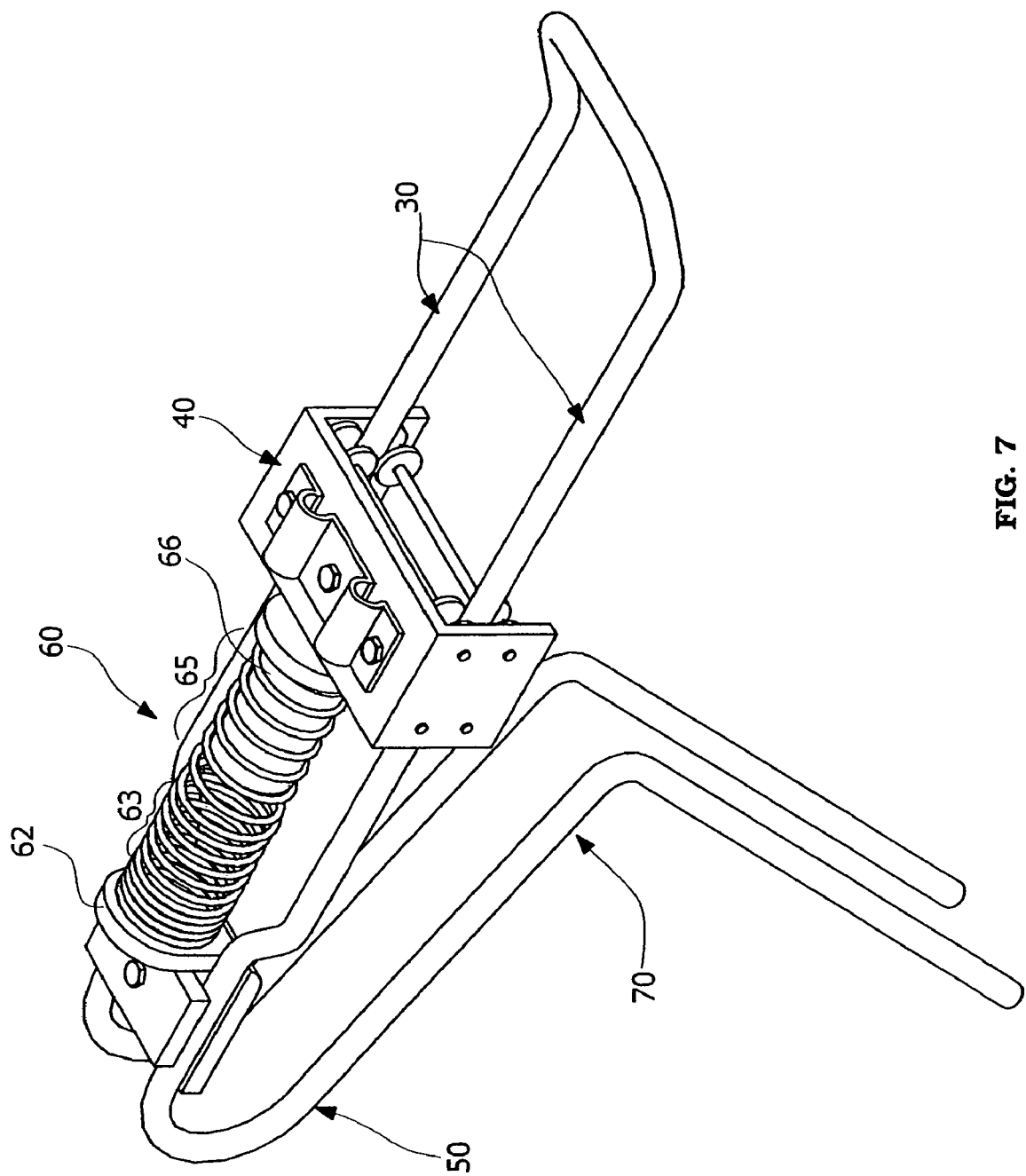
FIG. 7 is a perspective view of a return/buffer spring included in the saddle, according to the present invention.

FIG. 7 shows the return/buffer spring 60 installed at the front portion of the seat sliding unit 40. As shown in FIG. 7, the return/buffer spring 60 is a coil spring that has a predetermined length and is provided between the seat sliding unit 40 and the stop plate 62 which is vertically installed at the front portion of the guide part 30, to be extended or contracted. A compression spring part 63 with a predetermined length is provided on a front portion of the return/buffer spring 60, and a tension spring part 65 with a predetermined length is provided on a rear portion of the return/buffer spring 60 to be integrated with the compression spring part 63. Thus, when the seat sliding unit 40 moves backward, the tension spring part 65 is extended backward, thus stopping the seat sliding unit 40 within a predetermined range. Conversely, when the seat sliding unit 40 moves forward, the compression spring part 63 returns to an original position thereof while strongly pulling the seat sliding unit 40 so that the seat sliding unit 40 returns to an original position thereof. As such, the return/buffer spring 60 according to this invention is constructed so that the compression spring part and the tension spring part are integrally provided on a single coil spring, thus simplifying a structure and maximizing the moving distance of the seat sliding unit 40. Further, a spring support rod 66 with a predetermined length is provided on the front surface of the seat sliding unit 40 to be inserted into a hollow part of the return/buffer spring 60, thus preventing the undesirable removal of the return/buffer spring 60. The spring support rod 66 is made of rubber having elasticity, thus serving as a stopper to stop the forward movement of the seat sliding unit 40.

Figure 8:
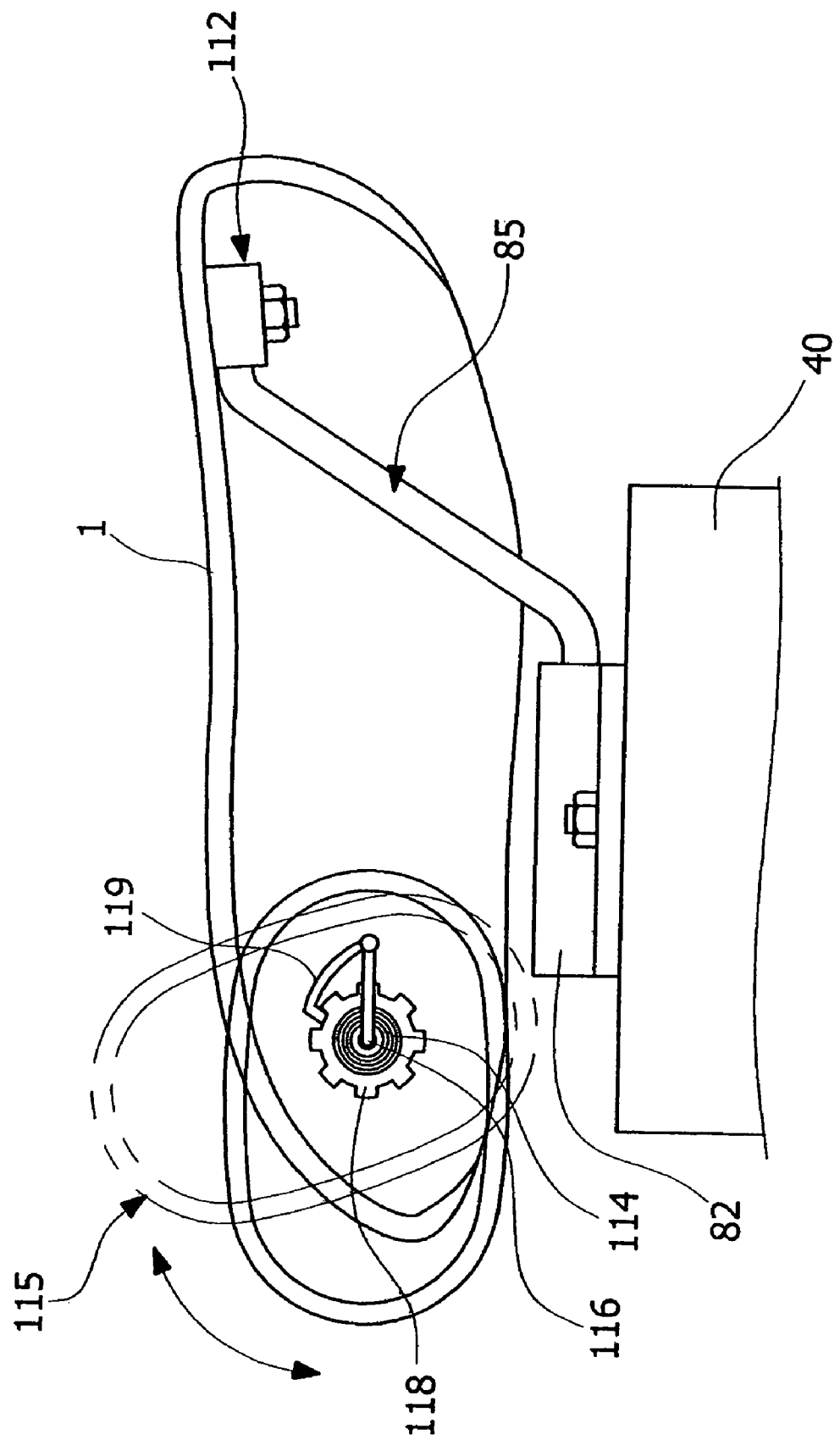
FIG. 8 is a side sectional view of the saddle, according to the present invention.

FIG. 8 is a sectional view to show an example of the seat 1 coupled to the guide part 30, according to the present invention. As shown in FIG. 8, a locking bracket 112 is provided on the lower surface of the seat 1 to fasten the upper end of each elastic support rod 85 to the seat 1, using a fastening bolt. A pommel 115 is provided on the front portion of the seat 1 to be pivotable in a vertical direction. The pommel 115 functions to efficiently transmit a force from a user to the seat 1, when the user pushes the seat 1 forwardly and upwardly. However, when it is not necessary to move the seat 1 forward and backward, the pommel 115 pivots downward so as not to be projected upward.

For example, a ratchet wheel 118, a locking pawl 119, and a spring 114 to bias the ratchet wheel 118 downward are installed at a rotating shaft 116 of the pommel 115. Thus, when a user desires to raise the pommel 115, the locking pawl 119 is pulled upward to release the pommel 115. In such a state, the pommel 115 is pivoted upward, and then locked to a predetermined angular position by the locking pawl 119. Conversely, when the user desires to lay the pommel 115 down, the locking pawl 119 is pulled upward. At this time, the pommel 115 is pivoted downward by the spring 114. When the pommel 115 has been pivoted downward, the seat 1 has a same shape as a conventional seat, so that the user can ride a bicycle without any inconvenience.

Figure 9:
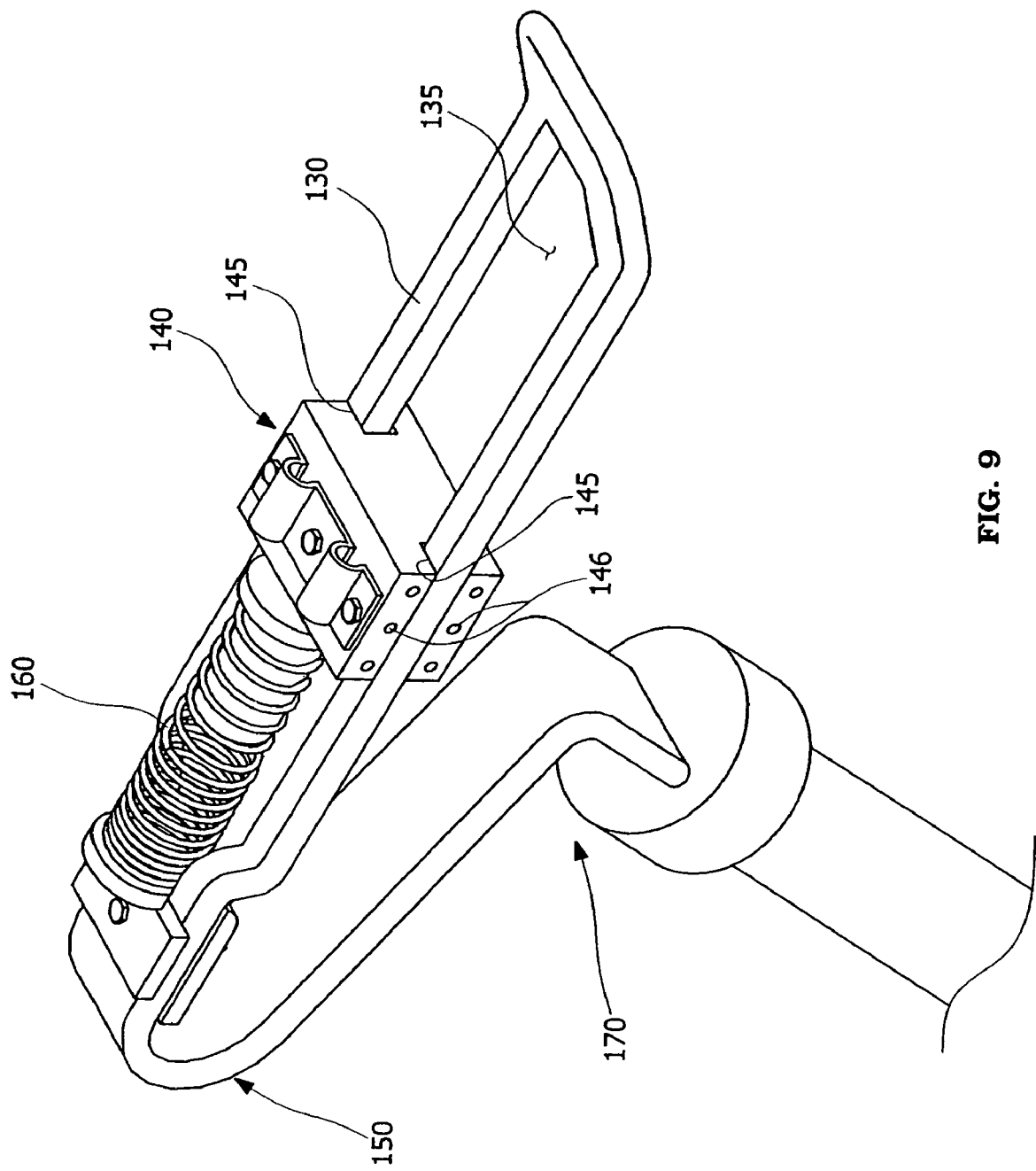
FIG. 9 is a perspective view of a saddle for bicycles, according to the fourth embodiment of the present invention.

FIG. 9 is a perspective view of a saddle for bicycles, according to the fourth embodiment of the present invention. As shown in FIG. 9, a guide part 130, a swiveling spring 150, and a support part 170 are integrated with each other, using a plate-shaped elastic material in place of a circular metal rod. As such, in the case of using a special elastic material including carbon fiber, it is preferable that a guide opening 135 with a predetermined width be longitudinally provided along an central axis of the guide part 130, and a seat sliding unit 140 be installed on the guide part 130 to be movable along the guide opening 135. Guide channels 145 are provided on opposite sides of the seat sliding unit 140 to engage with the guide part 130, thus preventing the seat sliding unit 140 from being removed from the guide part 130. Preferably, rolling wheels 146 are provided in the guide channels 145. Further, when the plate-shaped elastic material is used as described above, the seat sliding unit 140 may be installed to surround the guide part 130, in place of installing the seat sliding unit 140 in the guide opening 135.

Figure 10:
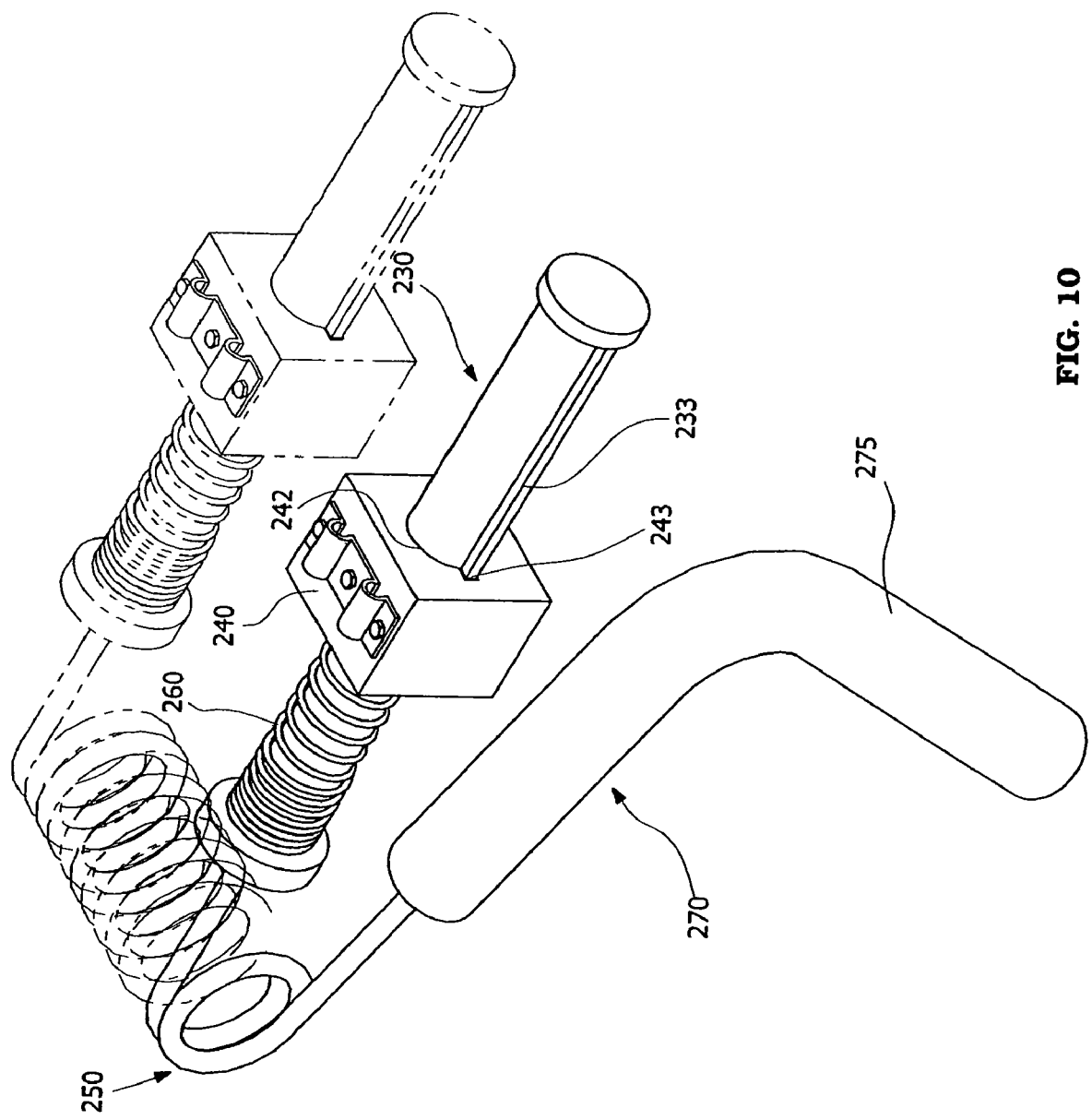
FIG. 10 is a perspective view of a saddle for bicycles, according to the fifth embodiment of the present invention.

FIG. 10 is a perspective view of a saddle for bicycles, according to the fifth embodiment of the present invention. As shown in FIG. 10, a guide part 230, a swiveling spring 250, and a support part 270 are separately manufactured, and then are assembled with each other. As shown in the drawing, the guide part 230 is a cylindrical pipe having a predetermined diameter, with a seat sliding unit 240 being fitted over the guide part 230 to slide forward and backward. A through hole 242 is formed at a center of the seat sliding unit 240 so that the guide part 230 passes through the through hole 242. Guide grooves 242 are provided on opposite sides of the through hole 242 to correspond to guide projections 233 of the guide part 230. Further, a coil-shaped return/buffer spring 260 is installed between a front end of the guide part 230 and the seat sliding unit 240. An elastic metal rod is wound in a coil shape to provide the swiveling spring 250. An upper portion of the swiveling spring 250 is supported by the guide part 230, while a lower portion of the swiveling spring 250 is supported by the support part 270. The support part 270 is also a cylindrical pipe, and is downwardly bent at a rear portion thereof to integrally provide a bent portion 275 that is inserted into the seat support frame 3. According to the embodiment, as shown by the arrows of FIG. 10, the guide parts 230 and the support parts 270 are coupled by the swiveling spring 250. Further, the guide parts 230 are installed on opposite sides to be spaced apart from each other by a predetermined interval. Similarly, the support parts 270 are installed on opposite sides to be spaced apart from each other by a predetermined interval. Such a construction ensures sufficient elastic force and stability.

Figure 11:
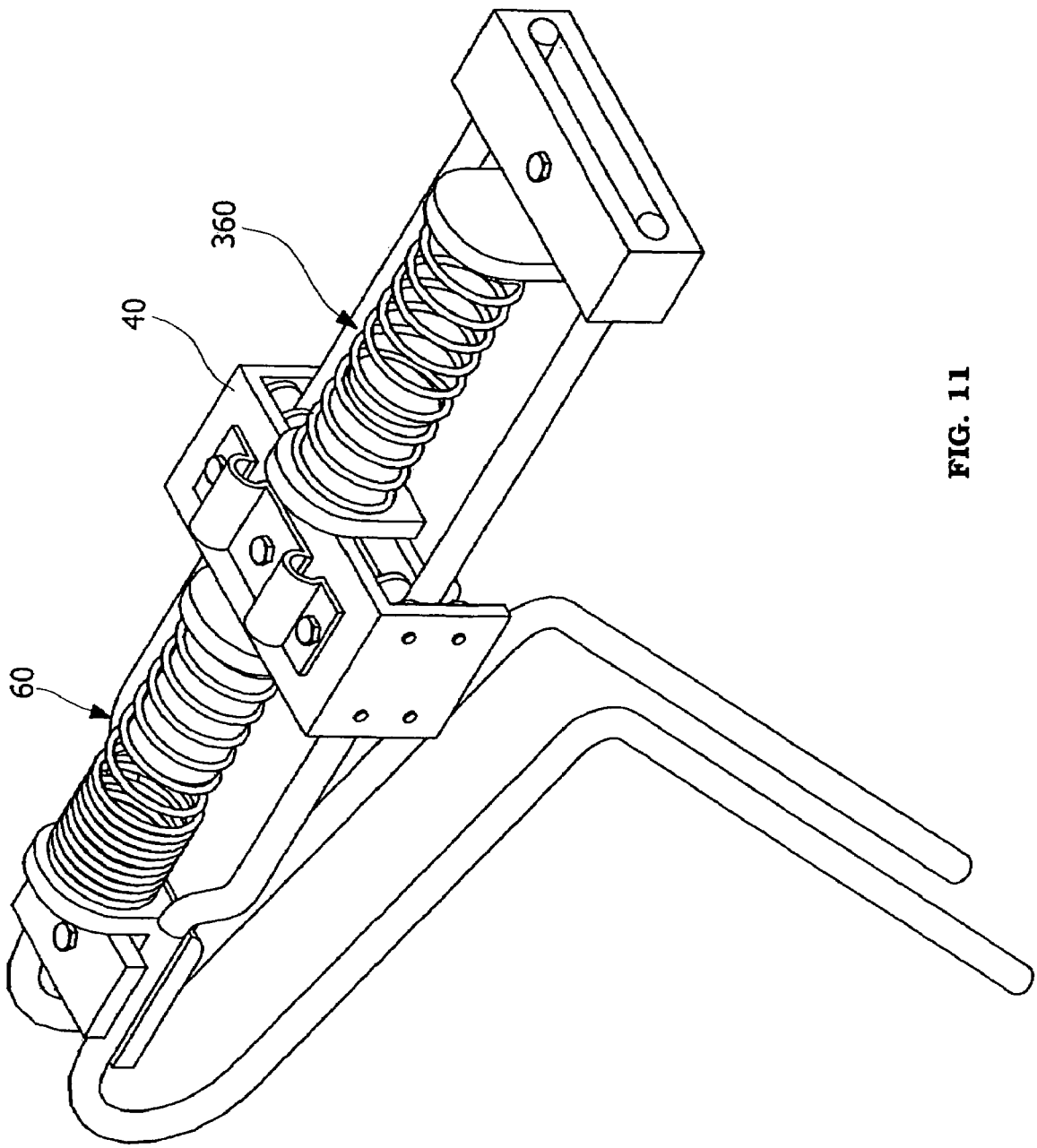
FIG. 11 is a perspective view of a saddle for bicycles, according to the sixth embodiment of the present invention.

FIG. 11 is a perspective view of a saddle for bicycles, according to the sixth embodiment of the present invention. As shown in FIG. 11, the saddle of the sixth embodiment is constructed so that return/buffer springs 60 and 360 are respectively installed in the front and back of the seat sliding unit 40 coupled to the guide part 30. The return/buffer spring 60 installed in the front of the seat sliding unit 40 is almost compression spring part, thus providing a strong restoring force when the seat sliding unit 40 moves forward. Meanwhile, the return/buffer spring 360 installed in the back of the seat sliding unit 40 is almost tension spring part, thus allowing the seat sliding unit 40 to be smoothly stopped, when the seat sliding unit 40 moves backward. Further, the return/buffer spring 360 is compressed by the seat sliding unit 40 which is moved backward, thus providing an additional elastic restoring force to the seat sliding unit 40. As such, the return/buffer springs 60 and 360 are respectively provided in the front and back of the seat sliding unit 40, thus increasing the buffering force and restoring force.

Figure 12:
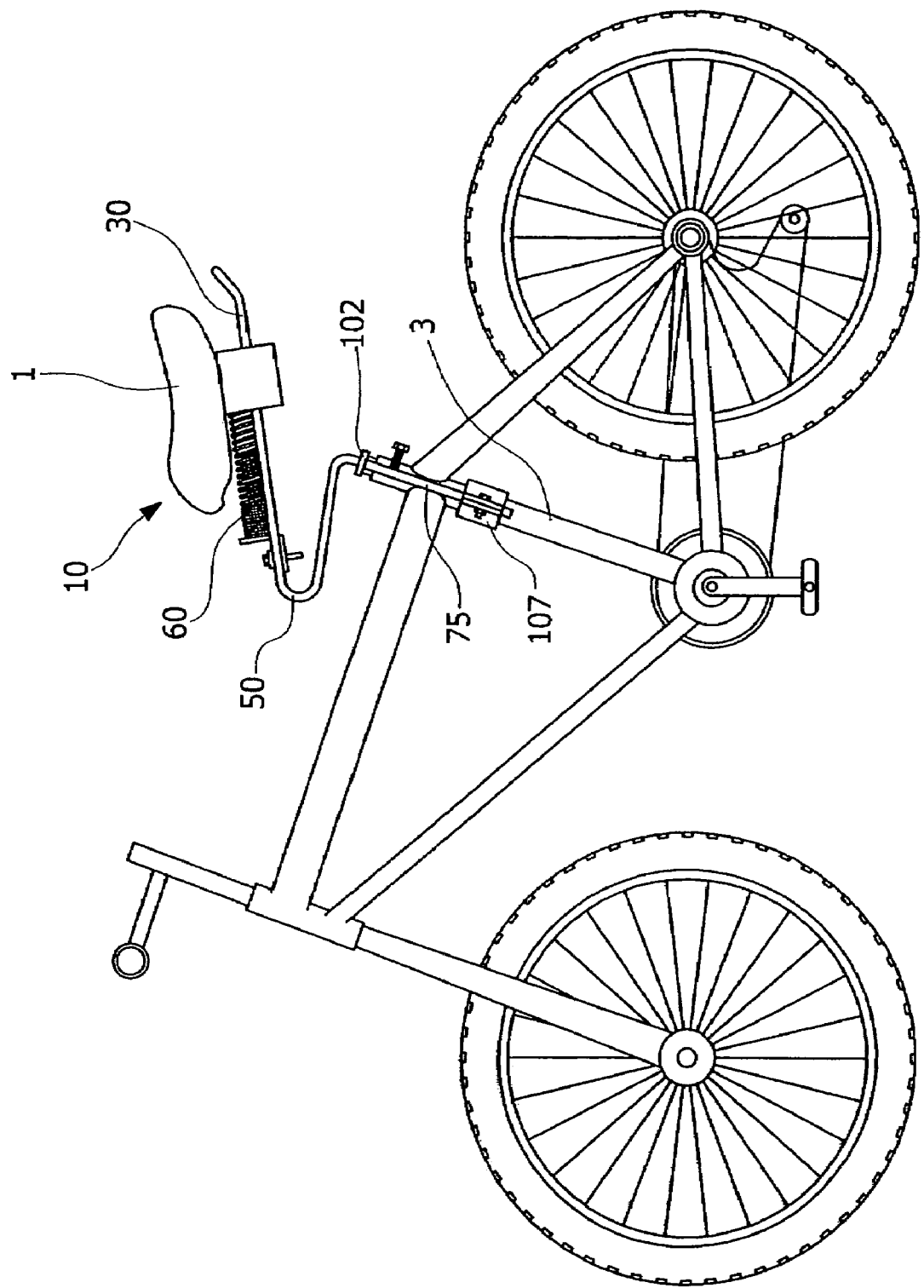
FIG. 12 is a bicycle equipped with the saddle, according to the present invention.

The installation and operational effects of the saddle 10 according to the present invention will be described with reference to FIGS. 3 and 12. As shown in FIG. 12, an existing fixed-type saddle is detached from the seat support frame 3, and then the saddle 10 of this invention is installed on the seat support frame 3, through a same method as that of installing the fixed-type saddle. For example, the insert rod 105 mounted to the lower surface of the mounting plate 102 is inserted into the seat support frame 3, and then is secured to a proper height according to a body type of a user. Next, the bent portion 75 is clamped to the seat support frame 3 using the clamp 107 so that the bent portion 75 is not rotated leftward and rightward.

The operational effects of the saddle 10 according to the present invention will be described in the following with reference to FIG. 3. When a user desires to use only the original function of a bicycle, the seat 1 is forward pulled to the maximum so that the seat 1 is positioned in front of the seat support frame 3. In this case, the user can ride the bicycle in a same manner as the conventional bicycle. Meanwhile, in the case of having the return/buffer spring 60 of this invention, the seat 1 is biased to be always positioned in front of the seat support frame 3, so that it is unnecessary for the user to pull the seat 1. Further, in the case of having the locking unit, it is preferable that the seat 1 be locked to a predetermined position by the locking unit, thus preventing the seat 1 from being moved backward.

Meanwhile, when the user desires to have the sensation similar to that of riding a horse, the locking unit is unlocked. Subsequently, the user pushes the seat 1 backward while sitting on the seat 1. When the seat 1 has been sufficiently moved backward, the user pushes the seat 1 forward while lifting the user's rear above the seat 1. Next, when the seat 1 has been sufficiently moved forward, the user pushes the seat 1 backward while sitting on the seat 1. In this way, when the user repeatedly moves the seat 1 forward and backward, and simultaneously adjusts the user's weight acting on the seat 1, the seat 1 is swiveled vertically by the restoring force and the buffering force of the swiveling spring 50 and the return/buffer spring 60, thus providing the sensation similar to that of riding a horse to the user.

According to the present invention, the user repeatedly sits down on the seat 1 and lifts the user's rear above the seat 1 so as to adjust the weight acting on the seat 1 while moving the seat 1 forward and backward, thus efficiently exercising the user's arms and torso. Therefore, the bicycle incorporating the saddle of this invention develops abdominal and arm muscles, in addition to efficiently exercising the lower part of the user's body in the same manner as the conventional bicycle. Further, the bicycle incorporating the saddle strengthens pelvic muscles and a sphincter, thus preventing urinary incontinence in women, and increasing stamina of men and promoting health.

As described above, the present invention provides a saddle for bicycles, which can be used without changing a structure of a conventional bicycle including a stationary bicycle, and has a vertical swiveling function and a horizontal sliding function, thus providing a sensation similar to that of riding a horse to a user while the user rides a bicycle.

Further, according to the present invention, a user moves a seat forward and backward while sitting on the seat, and simultaneously, repeatedly sits down on the seat and lifts the user's rear above the seat to adjust weight acting on the seat, thus preventing dysuria and a sexual dysfunction due to a sensation of pressure on the perineal region when pedaling a bicycle, different from a conventional fixed-type saddle. The saddle of this invention exercises the upper part of the body including the pelvis and torso as well as the lower part of the body and the abdominal region, thus exercising every part of the body. As such, a bicycle equipped with the saddle exercises the exercise of the whole body, so that a range of motion is increased in comparison with the conventional bicycle.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A saddle coupled to a seat support frame of a bicycle, comprising:
    a seat;
    a seat sliding unit provided on a lower surface of the seat to move the seat forward and backward, as a user moves forward and backward while sitting on the seat;
    a guide part having a predetermined length, and supporting the seat sliding unit to guide a horizontal movement of the seat sliding unit within a predetermined range, with a free end provided at a rear end of the guide part to allow the guide part to be swiveled vertically, when a weight is applied to or removed from the guide part;
    a swiveling spring provided at a front end of the guide part to provide a vertical elastic force to the guide part; and
    a support part to support the swiveling spring, and comprising a downwardly bent portion to couple the support part to the seat support frame;
    wherein the guide part extends in front of the seat such that the swiveling spring is in front of the seat and the guide part extends in back of the seat support frame such that the seat sliding unit slides in back of the seat support frame on the guide part to enhance the vertical swiveling of the seat on the guide part; and
    wherein the seat sliding unit slides freely on rollers on the guide part.

2. The saddle according to claim 1, wherein the guide part extends in front of and in back of the seat support frame to predetermined lengths, the free end being provided at the rear end of the guide part, and the swiveling spring being provided at the front end of the guide part.

3. The saddle according to claim 1 wherein the swiveling spring is manufactured to have the vertical elastic force, by bending a rod- or plate-shaped elastic material into a V-shape.

4. The saddle according to claim 1, wherein the swiveling spring is manufactured to have the vertical elastic force, by winding a rod-shaped elastic material into a coil shape.

5. The saddle according to claim 1, wherein the support part is integrated with the swiveling spring to support the swiveling spring, and is placed under the guide part to be spaced apart from the guide part by a predetermined distance, thus allowing the guide part to be swiveled vertically, the support part comprising a downwardly bent portion with a predetermined length to be coupled to the seat support frame using the downwardly bent portion.

6. The saddle according to claim 5, wherein the support part forwardly extends from the seat support frame to a predetermined length.

7. The saddle according to claim 1, further comprising:
    a return/buffer spring provided on a front portion of the guide part to provide a buffering force and a restoring force to the seat sliding unit, when the seat sliding unit moves forward and backward.

8. The saddle according to claim 7, wherein the return/buffer spring is a coil spring comprising a compression spring part and a tension spring part that each have a predetermined length and are integrated with each other into a single structure.

9. A saddle coupled to a seat support frame of a bicycle, comprising:
    a seat;
    a guide part to extend in opposite directions of the seat support frame to predetermined lengths so that a seat is installed on the guide part;
    a swiveling spring integrally provided at a front end of the guide part to vertically swivel a rear end of the guide part, by a weight applied to or removed from the seat;
    a support part integrated with the swiveling spring to support the swiveling spring, and placed under the guide part to be spaced apart from the guide part by a predetermined distance, thus allowing the guide part to be swiveled vertically, the support part comprising a bent portion with a predetermined length to be coupled to the seat support frame using the bent portion;
    a seat sliding unit provided on a lower surface of the seat to forwardly and backwardly move along the guide part;
    wherein the guide part extends in front of the seat such that the swiveling spring is in front of the seat and the guide part extends in back of the seat support frame such that the seat sliding unit slides in back of the seat support frame on the guide part to enhance the vertical swiveling of the seat on the guide part; and
    a return/buffer spring provided between a front end of the guide part and the seat sliding unit to provide a buffering force and a restoring force to the seat sliding unit, when the seat sliding unit moved forward and backward.

10. The saddle according to claim 9, wherein the guide part, the swiveling spring, and the support part are manufactured to have asymmetric structure while both sides of each of the guide part, the swiveling spring, and the support part are spaced apart from each other by a predetermined distance with bent elastic metal rod with a predetermined diameter and length.

11. The saddle according to claim 9, further comprising:
    a mounting plate provided on an upper end of the bent portion of the support part, with an insert rod having a predetermined length being mounted to the mounting plate to be inserted into a hollow part of the seat support frame.

12. The saddle according to claim 9, wherein the seat sliding unit comprises:
    a body comprising an upper plate and side plates; and
    a plurality of rollers each having a guide groove to guide the guide part, the rollers being coupled to each other by a horizontal shaft to be rotatably supported by the side plates.

13. The saddle according to claim 9, further comprising:
    a clamping plate provided on an upper plate of the seat sliding unit to clamp two elastic support rods, the elastic support rods defining a predetermined space between the seat sliding unit and the seat, and providing an elastic force to the seat.

14. The saddle according to claim 9, further comprising:
a pommel provided at a front portion of the seat to vertically pivot with respect to a rear portion of the seat.

15. The saddle according to claim 9, wherein the guide part, the swiveling spring, and the support part are manufactured by bending a plate-shaped elastic material, with a guide opening having a predetermined width being longitudinally provided along a central axis of the guide part, and the seat sliding unit being installed in the guide opening to move forward and backward.

16. The saddle according to claim 9, wherein the guide part is a cylindrical pipe manufactured as a separable component, and the seat sliding unit having, at a center thereof a through hole, is slidably fitted over the guide part.

17. The saddle according to claim 9, wherein two return/buffer springs are respectively installed between the front end of the guide part and the seat sliding unit, and between the seat sliding unit and a rear end of the guide part, thus providing the buffering force and the restoring force to the seat sliding unit, when the seat sliding unit moves forward and backward.

18. A saddle coupled to a seat support frame of a bicycle, comprising:

a guide part to extend in opposite directions of a seat support frame to predetermined lengths so that a seat is installed on the guide part;

a swiveling spring integrally provided at a front end of the guide part to vertically swivel a rear end of the guide part, by a weight applied to or removed from the seat;

a support part integrated with the swiveling spring to support the swiveling spring, and placed under the guide part to be spaced apart from the guide part by a predetermined distance, thus allowing the guide part to be swiveled vertically, the support part comprising a bent portion with a predetermined length to be coupled to the seat support frame using the bent portion;

a seat sliding unit provided on a lower surface of the seat to forwardly and backwardly move along the guide part;

wherein the guide part, the swiveling spring, and the support part are manufactured by bending a plate-shaped elastic material, with a guide opening having a predetermined width being longitudinally provided along a central axis of the guide part, and the seat sliding unit being installed in the guide opening to move forward and backward; and a return/buffer spring provided between a front end of the guide part and the seat sliding unit to provide a buffering force and a restoring force to the seat sliding unit, when the seat sliding unit moved forward and backward.

* * * * *